Jan. 7, 1941. J. L. MORRIS 2,227,551
PIPE COUPLING AND PIPE CLAMP
Filed June 7, 1939 2 Sheets-Sheet 1

Jolly L. Morris,
INVENTOR.
BY Ralph Donath
ATTORNEY

Jan. 7, 1941.  J. L. MORRIS  2,227,551
PIPE COUPLING AND PIPE CLAMP
Filed June 7, 1939 2 Sheets-Sheet 2
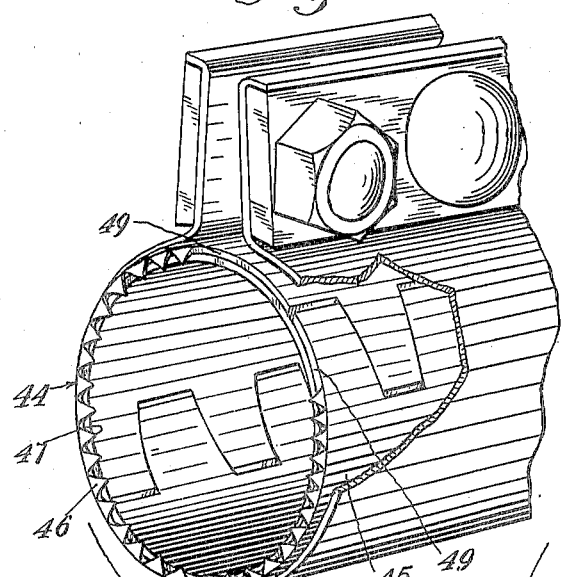
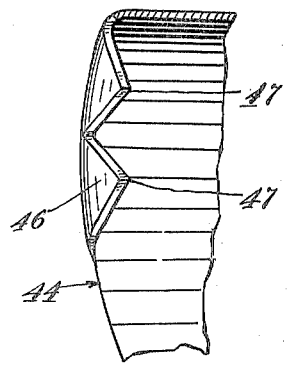
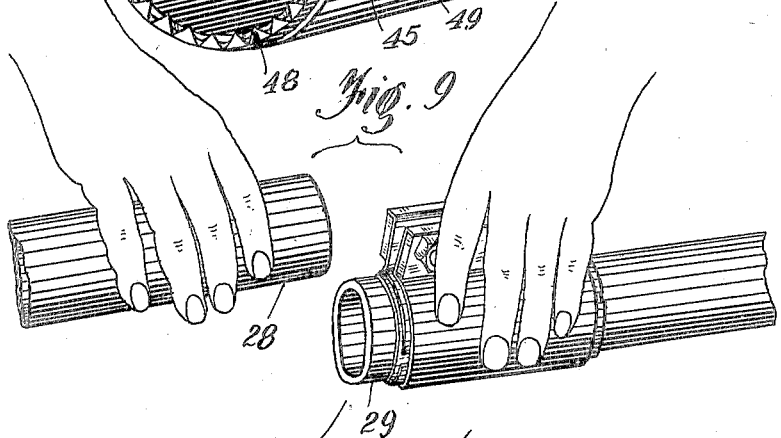
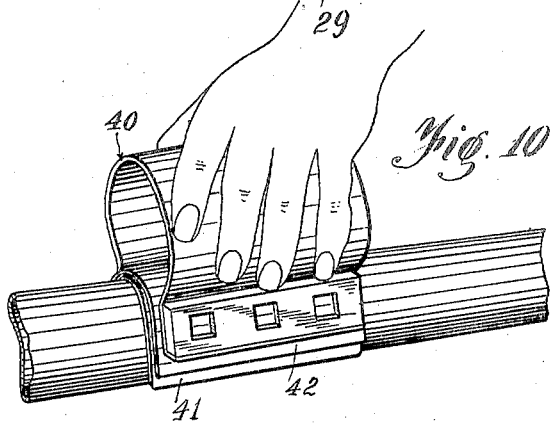
Jolly L. Morris
INVENTOR.
BY Ralph Douath
ATTORNEY.

Patented Jan. 7, 1941

REISSUED

AUG 4- 1942

2,227,551

UNITED STATES PATENT OFFICE 2,227,551

PIPE COUPLING AND PIPE CLAMP

Jolly L. Morris, Houston, Pa.

Application June 7, 1939, Serial No. 277,830

2 Claims. (Cl. 285—194)

This invention relates to pipe couplings and pipe clamps and has particular reference to couplings and clamps employed with pipe lines used in conducting water, gas or other fluids.

One of the objects of the invention is to provide a pipe coupling capable of obtaining a fluid tight joint.

Another object of the invention is to eliminate expensive unions or collar leak clamps.

Still another object of the present invention is to provide a pipe coupling which can be used in connection with threaded or plain end pipes.

Yet another object of the invention is to provide a pipe coupling for connecting pipe ends in which only a minimum ditch is required when laying buried pipe lines.

Another object of the invention is to provide a pipe coupling which may be used for joining old pipes without requiring to rethread the old pitted or battered pipe ends.

Still another object of the invention is to provide a pipe coupling which may be readily applied to the pipe ends completely factory assembled.

A further object of the invention is to provide a pipe coupling or pipe clamp which is of light weight, inexpensive to manufacture and yet one which will be exceedingly effective for the purpose for which it is designed.

A still further object of the invention is to provide a pipe coupling which may be used in connection with pipe lines as used in mines, etc., which are made of wood, fibre or other acid resisting materials.

Other objects and advantages to be derived from the use of the improved pipe coupling and pipe clamp will appear from the following detail description and claims, taken in connection with the accompanying drawings, in which similar reference numbers indicate corresponding parts.

Referring to the accompanying drawings, in which:

Figure 7 is a fragmentary perspective view of a pipe coupling used for acid resisting pipes produced from wood, fibre, etc., or other suitable material.

Figure 8 is an enlarged perspective view showing a portion of the serrations at the ends of the metal sleeve as used in Figure 7.

Figure 9 shows the method of sliding the completely assembled pipe coupling over one of the pipe ends.

Figure 10 shows the method of applying the pipe clamp shown in Figures 4 and 5 over a leak in a pipe.

Figure 1:
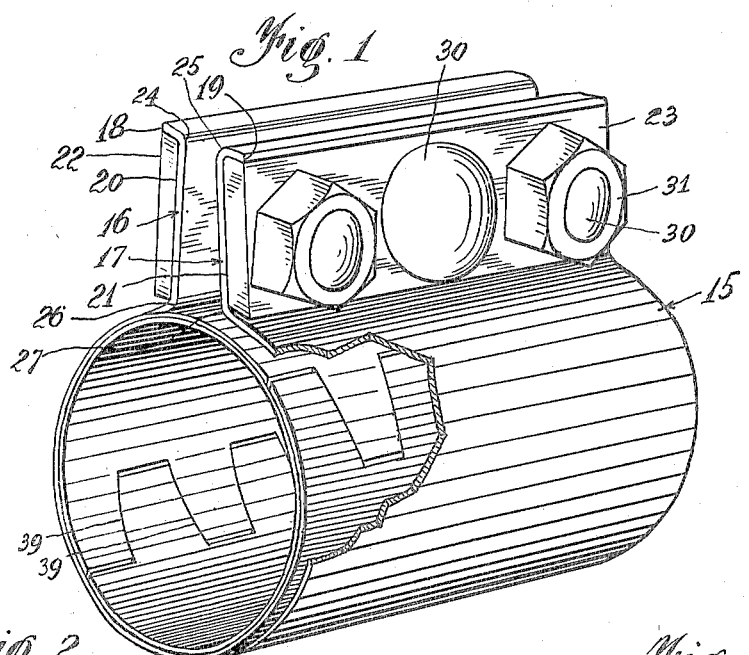
Figure 1 is a perspective view of a pipe coupling in accordance with the present invention, showing part of the shell broken away.
Figure 2:
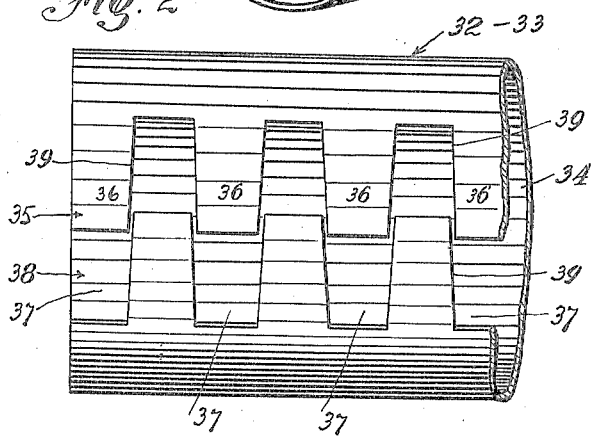
Figure 2 is a side elevation of the gasket or the metal sleeve as used in this invention.
Figure 3:
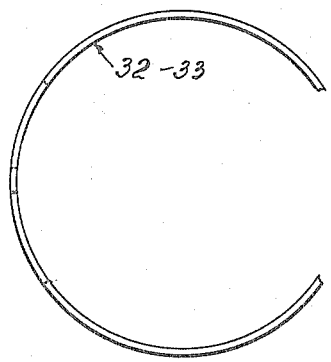
Figure 3 is a front view of Figure 2 partly broken away.

Referring more particularly to Figures 1, 2 and 3 of the drawings, 15 represents a substantial cylindrical shell, preferably made of rust resisting sheet material, provided with a pair of bent-up longitudinal flanges 16 and 17 extending throughout the entire length of said shell 15. The free ends 18 and 19 of these flanges 16 and 17 are bent outwardly to form channel-like recesses 20 and 21 adapted to receive the reinforcing steel strips 22 and 23 which are spot welded or otherwise permanently secured in a manner as shown in Figure 1.

It will be noted, that aforesaid flanges 16 and 17 are inwardly toed (Figure 1), so that the upper edges 24 and 25 will meet first instead of the lower edges 26 and 27 when tightening the pipe coupling around the pipe ends 28 and 29 by means of bolts 30 and nuts 31.

Figures 2 and 3 represent the cylindrical gasket 32 and the cylindrical metal sleeve 33 as used in the pipe coupling, both are of substantially identical construction and outline and for that reason I have not thought it necessary to show them separately. Said sleeve 33 consists of a cylindrically shaped open body 34, one edge 35 of which being provided with a series of longitudinally disposed and equally spaced tongues 36 interengaging with recesses 37 at the other edge 38 of said body 34.

These tongues 36 and recesses 37 are slightly tapered, as indicated by the numeral 39 so that the side edges of the tongues 36 come in close abutment (see Figure 1) when the pipe coupling is tightened over the pipe ends 28 and 29.

The cylindrical gasket 32 is made substantially identical with cylindrical sleeve 33, with the exception that the gasket 32 is of smaller diameter than the sleeve 33 to take care of the thickness of the gasket material.

Figure 9 of the drawings shows the pipe coupling completely assembled, but not tightened, and slipped over the pipe end 29 of a pipe line, the other pipe end 28 is then brought in alignment with pipe end 29 and the coupling slid back over the other pipe end 28 so that the butting ends of both pipe ends come in the center of the coupling after which it is tightened by the bolts and nuts 30 and 31 respectively.

Referring now to Figures 4, 5, 6 and 10, the numeral 40 represents the shell 15 when used as a pipe clamp. This type is preferably used for repairing leaks in a pipe line, not including leaks at the joints. Figure 10 shows the simple method of applying the pipe clamp 40 over a leak in a pipe line.

Figures 4, 5, 6:
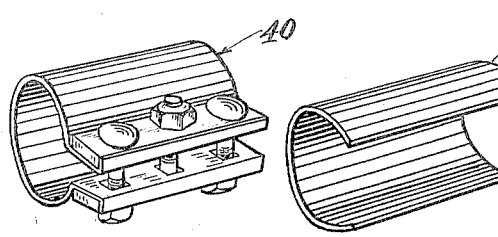
Figure 4 is a reduced perspective view of the shell of the pipe coupling shown in Figure 1 as used as a pipe clamp.
Figure 5 shows a reduced perspective view of the metal sleeve and the gasket as used for the pipe clamp shown in Figure 4.
Figure 6 is a reduced perspective view of the gasket strip as used with the pipe clamp shown in Figure 4.

In this case, the gasket 41, shown in Figure 5, is wrapped around the leak in the pipe after which the metallic open sleeve 42 (same drawing, Figure 5) as gasket 41 is placed directly over said gasket 41 and finally the shell 40 is pushed over the pipe with a slight pressure of the hand after which the shell is tightened by means of the bolts and nuts.

If desired, the gasket 41 and the metallic sleeve 42 may be eliminated and instead a strip of gasket material 43 may be effectively used in connection with the shell 40 to repair a small leak in a pipe.

A modification of Figure 1 is shown in Figure 7 wherein the remote ends 44 of the cylindrical metallic sleeve 45 are provided with radially arranged serrations 46.

As is well known in the art, pipe lines in mines for conveying liquids are subjected to corrosion and for that reason, wood, fibre or other suitable materials replace the steel pipes ordinarily used. These non-metallic pipes are always exteriorly protected with a heavy coat of pitch or asphalt and it is for that reason that the pipe coupling shown in Figure 7 has been designed because it will positively prevent longitudinal slipping especially in high pressure pipe lines.

In employing the improved pipe coupling shown in Figure 7, the completely assembled pipe coupling is applied over the pipe ends 28 and 29 in a manner as previously described for the pipe coupling shown in Figure 1.

When the pipe coupling is clamped over the asphalt or pitch covered pipe ends 28 and 29, the sharp points 47 of the serrations 46 are bent inwardly and preferably formed integral with the remote ends 44 of metal sleeve 45 so as to produce an annular and serrated flange 48. In order to facilitate the tightening of said sleeve 45, several serrations near the open longitudinal joint are removed as shown and indicated by the numeral 49.

A pipe coupling thus constructed is particularly adapted for use in mines, where pipe lines are usually made of wood or other acid resisting material, providing a coupling which is adaptable to allow it to embrace more effectually the pipe ends 28 and 29 and also prevent it from shifting thereon due to the serrations 46 which bite into the pipe ends when tightened.

The gasket used in connection with the pipe couplings and pipe clamps may be of rubber, lead or other similar material, according to the purposes for which the line of pipe is employed and the packing most suitable therefor.

From the foregoing description taken in connection with the drawings, the construction of the devices and the method of application will be readily apparent to those skilled in the art to which the invention appertains, and while describing the principle of operation of the invention together with the devices which are now considered to be the best embodiment thereof, it is to be understood that various changes in the form, proportion and the minor details of construction may be resorted to without departing from the principle or sacrificing any of the advantages of the invention as defined in the appended claims.

What I claim is:

1. In a pipe coupling, a cylindrical shell open along one side and having outstanding flanges along its side opening, a sleeve fitting within said shell, a tubular bushing fitting within said sleeve, the sleeve and the bushing being each slit longitudinally and along its slit formed with interfitting fingers, the fingers of the sleeve being spaced from the fingers of the bushing circumferentially thereof and also spaced from the side opening of the shell circumferentially thereof, and bolts passing through said flanges for drawing the same toward each other and contracting the shell and the sleeve and the bushing tightly about pipe sections received in the bushing through opposite ends thereof, said fingers being shifted with the sleeve and the bushing and being tapered longitudinally to dispose their side edges in wedging engagement with side edges of interfitting fingers while ends of the fingers are spaced from inner ends of finger-receiving spaces between the said interfitting fingers.

2. In a pipe coupling, a shell open at its ends and along one side, a sleeve in said shell, a bushing in said sleeve, the sleeve and the bushing being each formed with a longitudinally extending slit cut to form interfitting fingers, and means for contracting the shell and holding the shell and the sleeve and the bushing tightly about pipe sections received in the bushing through opposite ends thereof, said fingers being tapered to dispose their side edges in wedging engagement with side edges of adjoining interfitting fingers and of a length to dispose ends of the fingers in spaced relation to inner ends of spaces between the fingers, the slit of the sleeve being spaced circumferentially thereof from the slits of the bushing and the shell and dispose imperforate portions of the sleeve and the shell in covering and sealing relation to the tongues.

JOLLY L. MORRIS.